US010423940B2

(12) United States Patent
Pollin et al.

(10) Patent No.: US 10,423,940 B2
(45) Date of Patent: *Sep. 24, 2019

(54) SYSTEM AND METHOD FOR REGISTERING FINANCIAL ACCOUNTS

(71) Applicant: Autoscribe Corporation, Gaithersburg, MD (US)

(72) Inventors: Robert E. Pollin, Rockville, MD (US); Brian E. Downey, Jr., Alexandria, VA (US); Sean A. Fleming, Germantown, MD (US)

(73) Assignee: Autoscribe Corporation, Gaithersburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,185

(22) Filed: Jan. 17, 2017

(65) Prior Publication Data

US 2017/0124539 A1    May 4, 2017

Related U.S. Application Data

(63) Continuation of application No. 13/679,545, filed on Nov. 16, 2012, now Pat. No. 9,576,279.

(60) Provisional application No. 61/698,574, filed on Sep. 8, 2012, provisional application No. 61/655,482, filed on Jun. 5, 2012.

(51) Int. Cl.
*G06Q 20/10* (2012.01)
*G06Q 20/12* (2012.01)
*G06Q 20/40* (2012.01)
*G06Q 10/10* (2012.01)
*G06Q 20/30* (2012.01)
*G06Q 10/00* (2012.01)

(52) U.S. Cl.
CPC ........... *G06Q 20/10* (2013.01); *G06Q 10/107* (2013.01); *G06Q 20/102* (2013.01); *G06Q 20/12* (2013.01); *G06Q 20/305* (2013.01); *G06Q 20/40* (2013.01); *G06Q 20/4014* (2013.01); *G06Q 10/00* (2013.01)

(58) Field of Classification Search
CPC .................................................... G06Q 20/10
See application file for complete search history.

(56) References Cited

U.S. PATENT DOCUMENTS 7,801,825 B2 * 9/2010 Kranzley ............... G06Q 20/02
380/281
2001/0056402 A1 * 12/2001 Ahuja ................ G06Q 20/1085
705/43

(Continued)

*Primary Examiner* — Kirsten S Apple
*Assistant Examiner* — Martin A Gottschalk
(74) *Attorney, Agent, or Firm* — Blank Rome LLP

(57) ABSTRACT

A session to enroll customers to make payments has two stages, a first stage completed on the telephone or on a merchant or debt collector website, and a second stage completed via a communications link such as a telephone or Internet link. The customer enrollment record is linked to financial account information received from the customer in the second stage and stored on a second, secure server. A token linked to the securely stored financial account information is returned to the merchant and then used by the merchant to initiate payments on that financial account. The merchant's personnel and customer record system do not store or have access to the underlying financial account information.

26 Claims, 15 Drawing Sheets

(56) References Cited

U.S. PATENT DOCUMENTS

| | | | |
|---|---|---|---|
| 2002/0087704 A1* | 7/2002 | Chesnais | H04L 29/06 709/228 |
| 2002/0107791 A1* | 8/2002 | Nobrega | G06Q 20/02 705/39 |
| 2004/0143550 A1* | 7/2004 | Creamer | G06Q 20/04 705/41 |
| 2005/0197962 A1* | 9/2005 | Critchfield | G06Q 10/10 705/53 |
| 2006/0235796 A1 | 10/2006 | Johnson et al. | |
| 2007/0250920 A1* | 10/2007 | Lindsay | G06F 21/31 726/7 |
| 2009/0048953 A1* | 2/2009 | Hazel | G06Q 20/04 705/35 |
| 2009/0132351 A1 | 5/2009 | Gibson | |
| 2011/0029436 A1* | 2/2011 | Norvell | G06F 21/31 705/67 |
| 2011/0078244 A1* | 3/2011 | Minter | G06Q 30/02 709/204 |
| 2011/0184853 A1* | 7/2011 | Mark | G06Q 20/10 705/39 |
| 2012/0023567 A1* | 1/2012 | Hammad | G06Q 20/12 726/9 |
| 2012/0030066 A1* | 2/2012 | Stringfellow | G06Q 20/02 705/26.41 |
| 2012/0259782 A1* | 10/2012 | Hammad | G06Q 20/12 705/44 |
| 2013/0198080 A1* | 8/2013 | Anderson | G06Q 20/3821 705/44 |

* cited by examiner

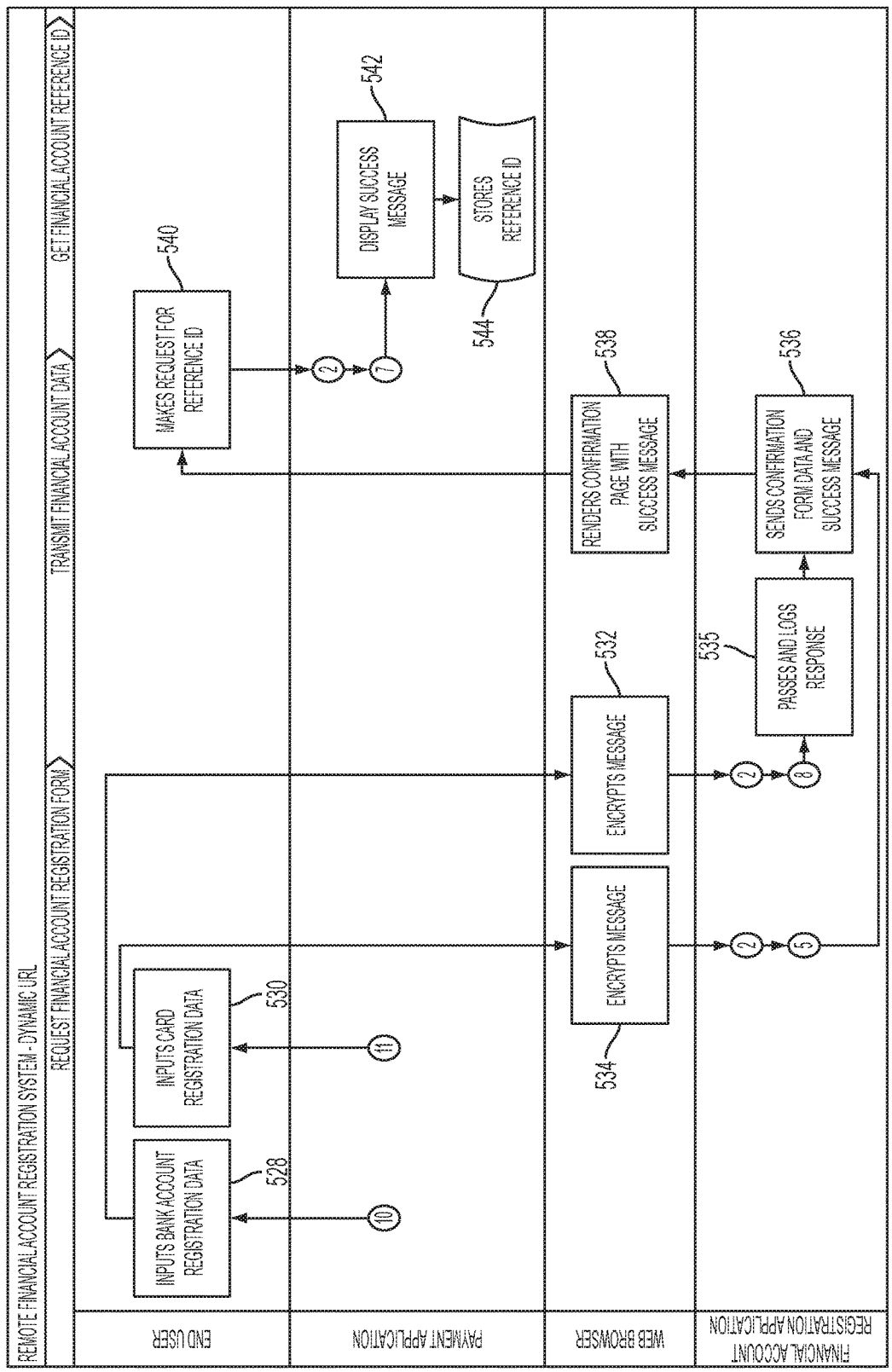

SYSTEM AND METHOD FOR REGISTERING FINANCIAL ACCOUNTS

This application is a continuation of U.S. application Ser. No. 13/679,545 filed Nov. 16, 2012, which claims the benefit of U.S. Provisional Patent Application Ser. No. 61/655,482 filed Jun. 5, 2012 and U.S. Provisional Patent Application Ser. No. 61/698,574 filed Sep. 8, 2012, the entire disclosure of which is incorporated herein by reference.

FIELD OF THE INVENTION

The present invention relates broadly to systems and methods for obtaining and using account information to process financial payments.

BACKGROUND

Fraud in credit card and other financial transactions is a major problem, and considerable resources are devoted to securing credit card and other account information provided to merchants by payers. A single breach of security incident can compromise millions of credit card accounts, and such breaches are reported on a regular basis.

The Payment Card Industry Data Security Standard (PCI DSS) is an information security standard for organizations that handle cardholder information for the major debit, credit, prepaid, e-purse, ATM, and POS cards.

Defined by the Payment Card Industry Security Standards Council, the standard was created to increase controls around cardholder data to reduce credit card fraud. Annual PCI compliance audits by an external Qualified Security Assessor (QSA) are required for organizations handling large volumes of transactions. The security and organizational measures required to comply with the PCI standards, and the cost of the annual audits, are borne by the individual organization. Underlying software applications may require substantial modifications to achieve compliance, and significant changes in organizational structure and operating procedures may also be required. Thus, the time, effort, and cost required for merchants and processors to obtain PCI certification to receive and use credit card data are substantial.

In one approach to managing these costs, credit card processing organizations have used tokenization to provide a link to credit card data for purposes of storage and retrieval. Tokenization is the process of replacing some piece of sensitive data with a value that is not considered sensitive outside the environment where it is stored and used. The token is a symbolic representation of a financial instrument or instruction that is only meaningful to participants in the processing cycle, and safeguards the permissible use of and access to the financial instrument to authorized users. In the payments industry, tokenization has become a popular means of bolstering the security of electronic transactions while minimizing the complexity of compliance with industry standards and best practices.

In the PCI context, tokens are used to reference cardholder data that is stored in a separate database, application or off-site secure facility that is PCI compliant to the appropriate level. Therefore, the token, which is non-sensitive data, can be stored and used in a wide range of systems in the organization, without bringing those systems within the scope of a higher-level PCI audit and more stringent compliance requirements.

However, there are limits in functionality of existing tokenization methods. There is a need for improvement in conventional approaches to obtaining and using account information to process financial payments.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In an example embodiment, an authenticated customer (payer) enrollment session is established, and a last stage of the enrollment session is completed via a communications link such as a telephone or Internet link. The enrollment session is initiated, for example, by a merchant or collector who has obtained at least an initial identification of the customer (also sometimes referred to as the payer). In an embodiment, an initial portion of the enrollment session is completed on the merchant's server, or a third-party server providing services to the merchant, with data entered by a customer service agent who receives information over a telephone, by a customer over a network such as the Internet, or using an initial data file received from another source, such as a file listing customer identification information for debt collection purposes. A second portion of the enrollment session is then completed on a secure server that may be different from the merchant's server. In a preferred embodiment, financial account information used to make one or more payments is submitted to the secure server while other less sensitive data elements such as the customer's name and address are submitted to the merchant's regular server. For convenience the server that stores the sensitive financial account information will be referred to herein as the "secure" server, but this naming convention should not be interpreted to suggest that the merchant's regular server cannot have security features or be highly secure in its own right. In some embodiments, the merchant's server and secure server may operate in the same location or may be the same hardware using a separated volume or partition, or memory section. However, in other embodiments particular advantages are realized through logical and/or physical separation of the merchant's server and the secure server.

The secure server, in a preferred embodiment, stores the financial account information received from the customer (either in the secure server or in a separate secure storage location) and provides a token to the merchant's server. Financial account information may include, for example, credit card numbers and security codes, bank routing and account numbers, or other financial account identifiers. While certain advantages can be realized by storing financial account information on the secure server, storage of data on the secure server is not limited to such information; the secure server may receive and store information other than financial account information, to the extent the merchant wishes to store such additional information on the secure server rather than on the merchant's server. The token is an index to the stored financial account information for that customer, and is stored by the merchant or a server or service controlled by the merchant or merchant's agent, in connection with the customer record, then used by the merchant to identify the customer account to be debited to process a payment authorized by the customer.

To process a payment from the customer, the merchant submits the token corresponding to the customer account to be debited, and information specifying the amount of the payment to the secure server. The operator of the secure server then processes the payment using the financial account pointed to by the token, and makes the proceeds available to the merchant. In this way, the merchant retains control of the customer's enrollment information and the ability to process payments whenever authorized, using financial account information provided by the customer, but does not hold the underlying financial account information or have security responsibility for that information.

BRIEF DESCRIPTION OF THE DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

FIGS. 4a through 4l together comprise a flow chart showing a further example embodiment of the process disclosed herein.

DETAILED DESCRIPTION OF THE PREFERRED EMBODIMENTS

The present invention will be described in terms of one or more examples, with reference to the accompanying drawings.

The present invention will also be explained in terms of exemplary embodiments. This specification discloses one or more embodiments that incorporate the features of this invention. The disclosure herein will provide examples of embodiments, including examples of data analysis from which those skilled in the art will appreciate various novel approaches and features developed by the inventors. These various novel approaches and features, as they may appear herein, may be used individually, or in combination with each other as desired.

In particular, the embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may implement such feature, structure, or characteristic in connection with other embodiments whether or not explicitly described.

Embodiments of the invention may be implemented in hardware, firmware, software, cloud computing, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in handheld computers, PDAs, mobile telephones, and other portable devices; magnetic disk storage media; optical storage media; thumb drives and other flash memory devices; electrical, optical, acoustical, or other forms of propagated signals (e.g. carrier waves, infrared signals, digital signals, analog signals, etc.), Internet cloud storage, and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Figure 1:
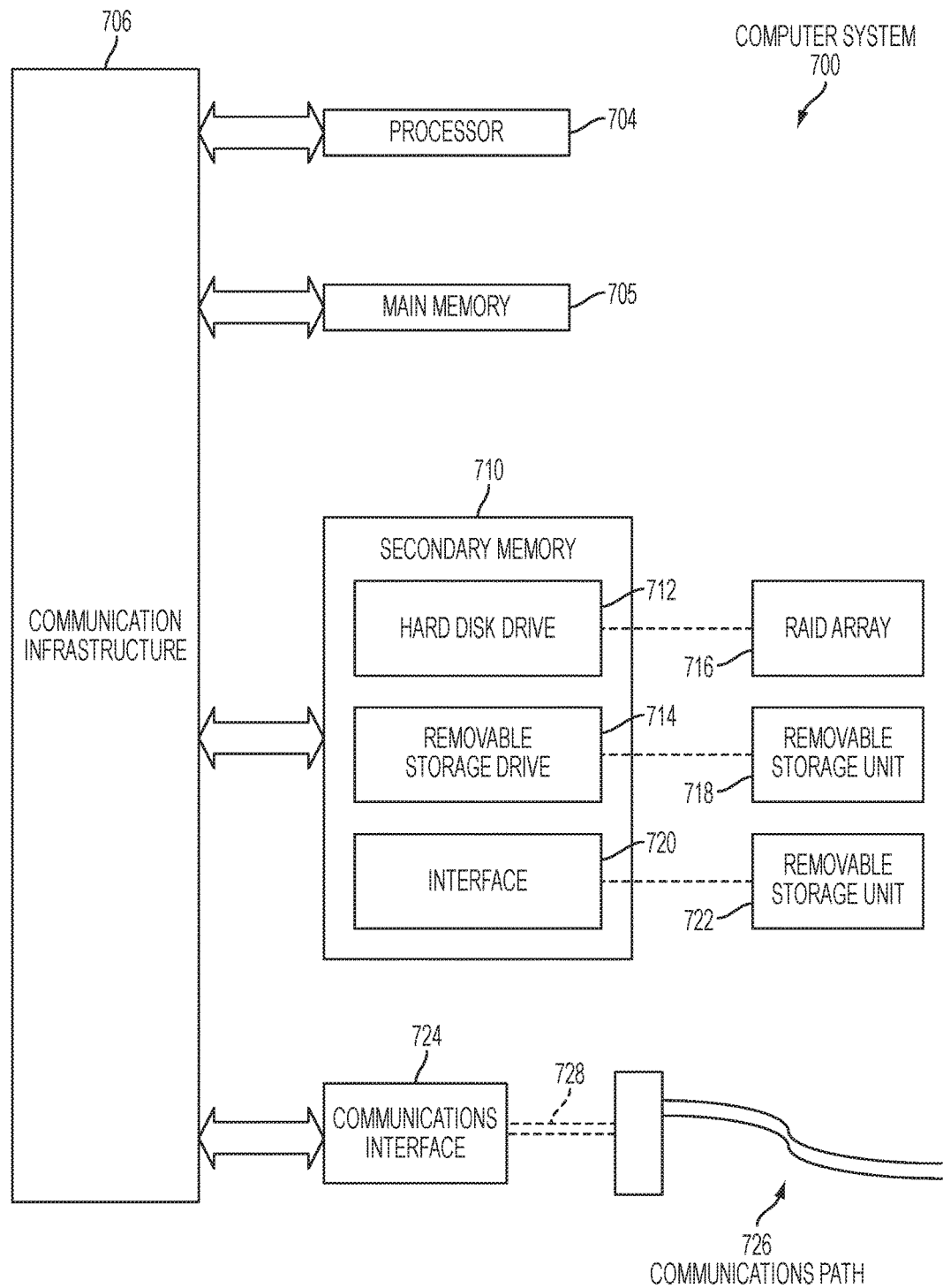
FIG. 1 is a block schematic diagram of an example computing system that can be used to implement functions described herein.

FIG. 1 is a block schematic diagram of an example embodiment of a computing system that can be used to perform the functions disclosed herein in both server and end user applications. The example embodiment shows a general-purpose computer system 700, such as a PC system. In particular, the methods disclosed herein can be implemented in hardware, or implemented as a combination of software and hardware. Consequently, desired features of the invention may be implemented in the environment of a computer system or other processing system. The example computer system 700 includes one or more processors, such as processor 704. Processor 704 can be a special purpose or a general-purpose digital processor. The processor 704 is connected to one or more communication infrastructures 706 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing an optical disk drive, solid state memory, USB port for a thumb drive, PC card slot, SD card slot for a flash memory, communications conduit to a cloud storage server or service, or other storage device. Secondary memory 710 may also include information storage in another location, but accessible through a network interface, such as storage on a separate computing system or a cloud. The removable storage drive 714 reads from and/or writes to a removable storage unit 718 in a well-known manner. Removable storage unit 718, for example, may be a magnetic drive, optical disk, thumb drive, flash memory device, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet interface), a communications port, a wireless network communications device such as an IEEE 802.11x wireless Ethernet device, 3G or 4G cellular data connection, a PC slot and card, cloud or network storage, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other present or future available communications channels.

The terms "computer program medium" and "computer usable medium" are used herein to generally refer to all available types of digital media, for example, removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed by the processor 704, enable the computer system 700 to implement the present invention as discussed herein. In particular, the computer programs, when executed, enable the processor 704 to implement the processes of the present invention. Where the invention is implemented using software, the software may be provided as a computer program product on media or transmitted digitally via one of the network connections available to computer system 700, and loaded into computer system 700, for example on raid array 716, removable storage drive 714, hard drive 712 or communications interface 724. The conventional, general-purpose computer systems described herein are customized to form a special purpose, inventive device by the installation of novel software that implements and enables novel methods. This software and the methods employed will now be described in more detail. The scope of the present invention is not limited to the specific examples provided here, but those skilled in the art will gain an understanding of the full scope of the invention through illustrations provided in a series of example embodiments.

Figure 2:
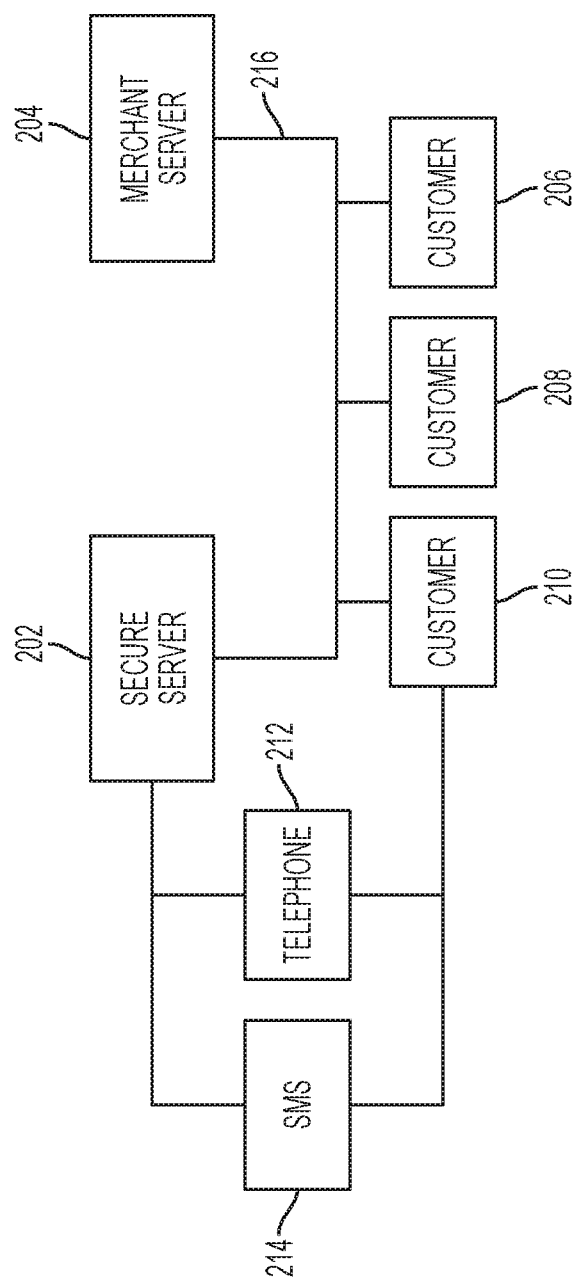
FIG. 2 is a block diagram illustrating connections of servers and systems in an example embodiment.

Referring to FIG. 2, in one example embodiment, an inventive system and method make functions available to merchants (and to third-party service providers to merchants) in an Application Programming Interface (API). A hosted system on a secure server 202 provides Financial Account Registration functions and Token Retrieval functions that can be accessed by merchants and others operating websites, for example using merchant server 204, to process payment transactions. Using the methods disclosed herein, in preferred embodiments merchants are able to process such transactions without transmitting, processing or storing Financial Account data. This reduces the potential liability of the merchants for data loss, and avoids placing their customer tracking and payment processing systems (such as merchant server 204) within the scope of the present Payment Card Industry Data Security Standard (PCI-DSS), thus reducing compliance costs, development costs, and accelerating time-to-market.

The server that stores the sensitive financial account information will be referred to herein as the "secure server," but this naming convention should not be interpreted to suggest that merchant server 204 cannot also have security features, or otherwise be highly secure in its own right. Further, while server 204 is described in these examples as a "merchant" server for convenience, the systems and processes disclosed herein are not limited to merchants, but are applicable to any operation that needs to process payments. Thus, merchant server 204 may serve merchants, debt collectors, non-profit organizations, political campaigns, service providers of any type, processors serving merchants or sub-merchants, and in general any individual or organization of any type that wishes to process payments from one or more individuals. Further, merchant server 204 may be operated by a third-party service provider to one or more merchants or other entities that wish to process payments using the methods disclosed herein.

Merchant server 204 and secure server 202 are connected by a communications network, such as the Internet, and can also be accessed by computer systems at one or more customer locations represented as 206, 208, and 210. A telephone interactive voice response interface 212 may be connected to secure server 202 and to the telephone network, allowing customer location 210 to provide information to the secure server via telephone, by speech recognition or tone entry. Similarly, a variety of other known communications networks, represented by the example of SMS data network 214, may be connected to secure server 202 to provide a link to customer equipment for receipt of payment information. The inventors anticipate that any available communications network, whether currently available or newly developed, may be used by the customers to provide financial account information in a secure manner to secure server 202.

The secure server 202, merchant server 204, and computers at customer locations 206, 208, and 210 may be, for example, general purpose computers such as the computer hardware described with reference to FIG. 1. Merchant server 204 and secure server 202 are provided with custom financial information registration software performing one or more functions described in example embodiments herein. The secure server 202 and merchant server 204 are also provided with Internet web server software allowing interactive exchange of information with customer sites 206, 208 and 210 via the World Wide Web. Computer equipment at customer sites 206, 208 and 210 are preferably provided with standard web browser software to facilitate interaction with secure server 202 and merchant server 204 as described in the example embodiments herein. For simplicity, servers 202 and 204 are illustrated in the drawings as single hardware units, but those skilled in the art will appreciate that the invention is not limited to any particular hardware configuration; thus, any desired server configuration can be used to implement the methods disclosed herein, including (as non-limiting examples) multiprocessor, multiple, grouped, parallel, distributed, replicated, and mirrored server configurations.

The financial account registration and token retrieval functions provided in the API can be implemented, in a first example, within the merchant's website hosted on merchant server 204, in a "widget" or frame, using either static or dynamic URL access to secure server 202 (the hosted system that maintains the financial data). Secure server 202 returns a token or other account identifier constituting a symbolic representation of the financial account information to merchant server 204 after the financial account information has been registered at secure server 202. Thereafter, merchant server 204 may use the token to process further payment transactions authorized by the end user or customer at sites 206, 208, 210 in their interaction with the merchant. Merchant server 204 may store customer identification information, purchase history, and other data that does not include financial account information such as credit card information, without being subject to PCI compliance requirements.

In an embodiment, an authenticated customer enrollment session is established, and a last stage of the enrollment session is completed via a communications link such as telephone link 212 or Internet link 216. The enrollment session is initiated by a merchant or collector who has obtained at least an initial identification of the customer. In an embodiment, an initial portion of the enrollment session is completed on the merchant's server, with data entry by a customer service agent who receives information over a telephone, by input from the customer over a network such as the Internet, or using an initial data file received from another source, such as a merchant's customer information file.

A second portion of the enrollment session is then completed on secure server 202. In a preferred embodiment, financial account information used to make one or more payments is submitted to secure server 202 while other data elements such as the customer's name and address are submitted to merchant server 204. Secure server 202, in a preferred embodiment, stores the financial account information received from the customer (for example from sites 206, 208, or 210) and provides a token to merchant server 204. Financial account information may include, for example, credit card numbers and security codes, bank routing and account numbers, or other financial account identifiers. While certain advantages can be realized by storing financial account information on secure server 202, storage of data on secure server 202 is not limited to such information; secure server 202 may receive and store information other than financial account information, to the extent the merchant wishes to store such additional information on secure server 202 rather than on the merchant server 204. The token is an index to the stored financial account information for that customer, and is stored by the merchant in connection with the customer record, then used by the merchant to identify the customer account to be debited to process a payment authorized by the customer.

Figure 3:
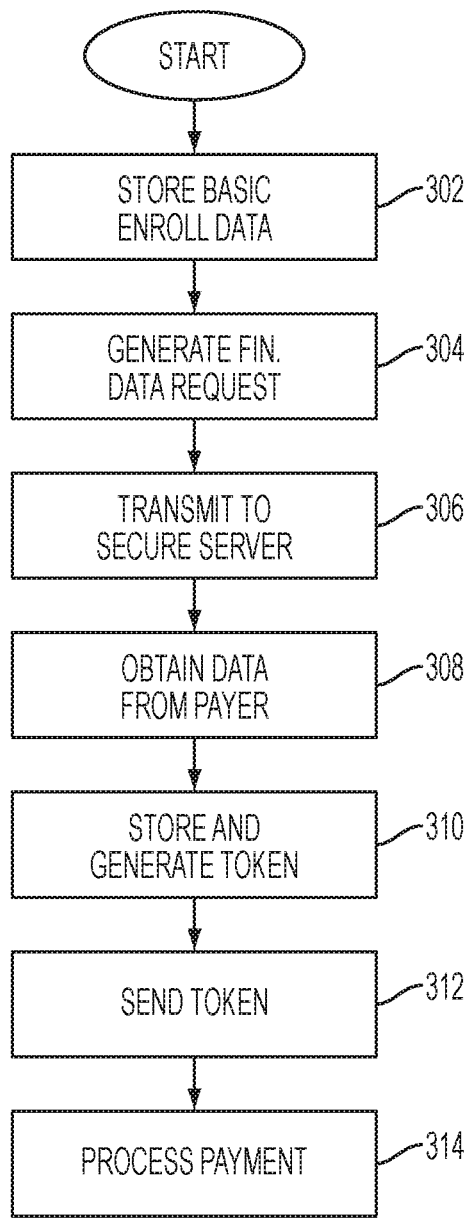
FIG. 3 is a flow chart showing a method of registering customer financial information and processing payments in an example embodiment.

FIG. 3 is a flow chart showing an example embodiment of a general method and process for enrolling a payer in an electronic system and then making a payment based on the enrollment. The method starts with step 302, in which enrollment data identifying a payer is stored in a first computing system. The first computing system may be, for example, the merchant server 204 shown in FIG. 2. The first computing system may be operated by a merchant, bill collector, or other individual or organization that will be the payee for anticipated payment transactions. As an example, this step can be accomplished by taking information from the payer over the telephone and entering it into merchant server 204, or by the payer entering their identifying information on an Internet website generated by merchant server 204 and operated by the payee or an agent of the payee.

Next, in step 304, the first computing system (for example, the merchant server 204) generates an electronic instruction to a second computing system, such as secure server 202, to obtain financial account information from the payer. The desired financial account information is distinguished, in this example, from identifying information in that financial account information refers to specific data used to process a payment, such as a credit card number, security code, and expiration date used to charge a credit card account, or the bank account and routing numbers used to process Automated Clearing House (ACH) transactions. The second computing system, in this example secure server 202, may typically be set up to provide a higher level of security than the merchant server in order to protect the sensitive financial account information that will be stored there, as such information could be used to perpetrate a fraud in case of a security breach. The instruction to the secure server 202 to obtain financial account information may also optionally include information specifying one or more available communications links to be used to obtain this financial account information. For example, as shown in FIG. 2, the World Wide Web, computers and mobile devices having access to email, text, SMS messaging, or other data networks, and voice or tone-responsive telephone connections may all be used to obtain the financial account information.

In step 306, this instruction is transmitted to the second computing system, which in this example is the secure server 202 of FIG. 2, for action.

In step 308, the second computing system communicates with the payer, through any of the communications channels described herein or any other available communications channel. The communications channel to be used may be determined by pre-programmed preferences or by the instruction from the merchant server, as appropriate to the situation. During this communication, the payer is preferably able to provide the sensitive financial account information to the second computing system without this information being visible or audible to personnel employed by the operator of the first computing system.

In step 310, the financial account information is stored in the second computing system and a token is generated for the referring payee (e.g. the merchant or operator of the merchant server). The token is a pointer that allows the payee to reference the financial account information of that payer without possessing the actual financial account information.

In step 312, the first computing system receives the token from the second computing system in response to its instruction to obtain financial account information for the payer. The token is stored in the first computing system in association with the electronic enrollment data for the payer. This completes the registration of the payer so as to enable one or more intended payments to the payee using the stored financial account information.

Next, in step 314, at any time after registration is complete, the payee can process an authorized payment from the payer by electronically generating a payment transaction instruction in the first computing system, including a representation of the token, and electronically transmitting the payment transaction instruction to a computing system other than the first computing system having access to said financial account information. For example, the instruction may be transmitted to the second computing system, e.g. the secure server 202. However, those skilled in the art will appreciate that computing processes may be divided between computers in a network in any desired manner, and that any number of computers may be used to perform a set of processing steps as is known in the art. Therefore, in this example the inventors have described the process in terms of a relatively simple exchange of data and instructions between two servers, but anticipate that in practice, these functions may be performed in some cases by a single computing system, and in other cases by a plurality of computing devices with the tasks divided between the computers in any desired manner. The second computer system or another computer system that receives the instructions and token (and can access the financial account information based on the token) processes the payment as requested, without the first computing system having any direct access to the payer's financial account information represented by the token.

In an example embodiment, to process a payment from the customer, merchant server 204 submits the token corresponding to the customer account to be debited and information specifying the amount of the payment to the secure server 202. The operator of the secure server 202 then processes the payment using the financial account pointed to by the token, and makes the proceeds available to the merchant. In this way, the merchant retains control of the customer's enrollment information and the ability to process payments whenever authorized, using financial account information provided by the customer, but does not hold the underlying financial account information or have security responsibility for that information.

In an embodiment, the enrollment session described with reference to the flow chart of FIG. 3 is established under the control of merchant server 204 and may optionally have a defined period of persistence, during which the second portion of the enrollment (submission of financial account information to the second computing system) is completed through secure server 202. The session may be set to expire after a specified time, if the second portion of the enrollment, e.g. the submission of financial account information to be linked with the enrollment, is not completed within that period.

The communications link established between the end user at locations 206, 208, 210 and the secure server 202 to complete the enrollment process may be either synchronous with the data link used to enter information into the merchant's server, or may be asynchronous. As non-limiting examples of communications channels that can be used for storing information on the secure server, telephone link 212, Internet link 216, and other available links such as SMS link 214 may be used to obtain the information.

Telephone. The customer may be transferred to, or invited to call, or may receive an automated call after having provided his/her telephone number, from an interactive voice response (IVR) system associated with the secure server operating through telephone interface 212. In this manner the customer may key in or speak the account number, preferably without any merchant representatives present on the call (although a three-way call can also be implemented if desired), and thus store this information in secure server 202.

Internet. Merchant server 204 may provide the customer at site 206, 208 or 210 with a widget or redirected URL that provides an online window for direct, preferably secure communication with the secure server 202 for entry of financial account information. If desired, the widget or window may be designed to appear as part of the merchant's data entry screen transmitted to the customer's browser from merchant server 204, so that the process of registering with data stored on two separate servers is seamless from the viewpoint of the customer. In another embodiment, the customer may receive an email via internet connection 216 containing a secure web address link or other instructions for providing the financial account information.

Other. Alternatively, the customer may receive a text communication via SMS interface 214 or any other available communications interfaces (not shown) containing a link to a secure web address or other instructions for entry of the financial account information.

In an embodiment, the merchant assigns a unique identification number to the customer, and the identification number or an index entry to the identification number is transmitted to the secure server as part of enrollment information that allows linking the data on the secure server to the particular customer enrollment record on the merchant's server.

To establish the second data entry session and link it to the appropriate open enrollment session, the customer may be invited to enter a shared secret, such as an assigned access key, partial or complete social security number, account number, telephone number, password, or other data to authenticate the customer for the second session. If the second session is synchronous with the first session (for example, the two data entry points are provided simultaneously on the same web page or a caller is transferred directly to an IVR system at the conclusion of a debt collection or order taking call) the existence of the connection with the customer for the merchant server data entry may provide sufficient authentication for a direct transfer to the second data entry process, without further authenticating steps. If the two processes are non-synchronous, for example, the second data entry occurs at some later time or even a later date, a further authentication may be appropriate. In an embodiment, the connection instructions and authentication shared secret may be provided to the customer by the secure server 202 without the merchant having such information, thus providing a further level of security to avoid employees of the merchant accessing the second session or its data.

Embodiments described herein provide significant unobvious advantages. For example, the process disclosed eliminates the possibility of security breaches at the merchant location that would expose financial account data, due to a keystroke logger, camera, or other similar data breach. The financial account information is never provided to the merchant's personnel, nor does it go through the merchant server or network. This mechanism may also reduce the amount of data entry required of the end user and reduce keyboarding errors.

In an embodiment, the token provided to the merchant is a symbolic representation of a financial instrument or account that is only meaningful to the merchant. Knowledge of this token is required for an authorized user to use the financial instrument or account.

The secure server 202 or "hosted system" preferably meets acknowledged security standards, such as PCI compliance, to safeguard the financial account information secured there. The secure server 202 processes transactions using this secured information upon receipt of instructions and a token or other customer identifier from the merchant system that identifies the account to be charged.

Transactions processed may include, for example, credit card, ACH, and any other type of transaction processed using stored financial account information. In addition, other information (beyond financial account information) can be stored in connection with the customer identifier or token. For example, other customer and credit account information may be stored by the host system in connection with the customer record associated with the customer identifier or token. Further, the payee may specify what types of cards are accepted as payment mechanisms. A payee can decide to accept or not accept various types of cards, such as debit cards, prepaid cards, and cards from particular issuing banks.

In another example embodiment, the merchant or other payee may provide an incentive for the payer to follow through with the process by entering financial account information for storage in the secure server. Information on an incentive for completing the intended payment setup may be transmitted to the secure server along with the instructions for obtaining the financial account information. The secure server then sends a message to the payer through one or more of the available communications channels (either initially, or in a follow-up message if the process is not completed promptly), offering the payer the indicated incentive. For example, the payer may be offered a discount, a gift, a coupon or voucher for additional goods or services, or any other desired incentive to complete the entry of financial account information and enable an expected payment.

FIGS. 4a through 4l together comprise a multi-page flow chart of a further detailed example embodiment of the system and method disclosed herein. The numbered connecting points in these flow charts correspond to the numbered connecting point the continuing process can be found. The functions performed are indicated in the flow chart blocks.

Further, the flow charts of FIGS. 4a through 4l incorporate "swim lane" information indicating where functions may be performed in the example embodiment. Locations shown include the End User system (for example, systems at location 206, 208 or 210), merchant server 204 (sometimes referred to as the "Payment Application" server), a Web Browser also operating at locations 206, 208, or 210, and the secure server 202 (sometimes referred to as the "Financial Account Registration Application" server). Functions are also divided in the example embodiment of FIG. 4a-4l among a calling system ("Integrated System"), and a secure server or combination of servers comprising the API engine (sometimes designated in the flow chart as PayAPI), a payment hub associated with the API engine, and a Financial Account Warehouse (secure storage location). An external credit card network is also connected to the system via a communications channel such as the Internet.

Those skilled in the art will appreciate that the flow charts provided herein are only one example implementation; functions may be reassigned as desired among the functional parts and locations of the system while remaining within the spirit of the invention.

Figure 4A:
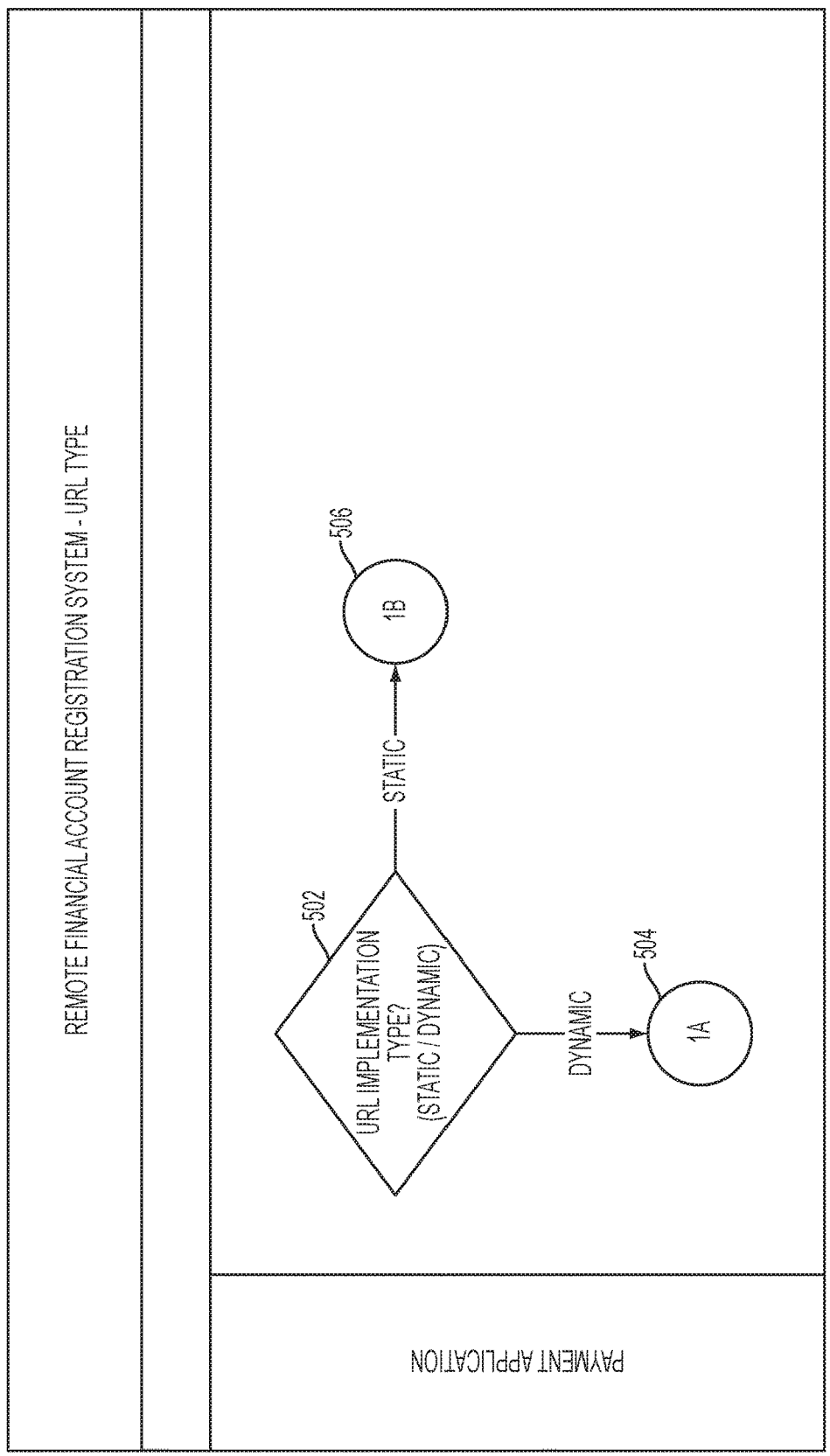

The detailed flow chart starts at FIG. 4a with main branch 502, indicating that the URL interface provided may be implemented either with a static URL in step 506 (designated as 1B) or a dynamic URL in step 504 (designated as 1A).

Figure 4B:
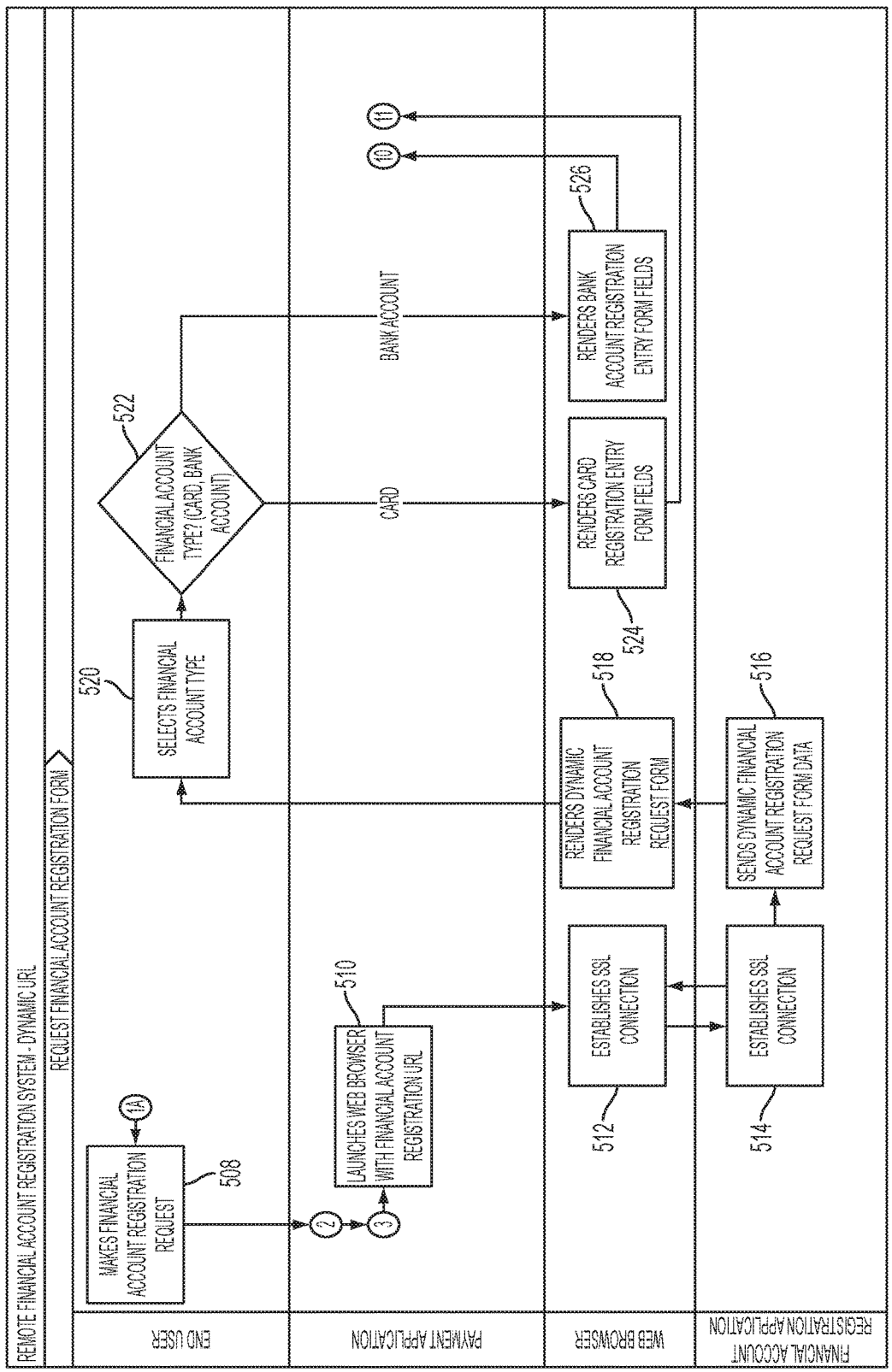

FIGS. 4b and 4c together show the continuing example flow chart for the dynamic URL implementation. Starting at step 508, the end user communicates with the Payment Application running on merchant server 204 to request registration of a financial account. The method then continues with a process of logging into the payment gateway (designated as subroutine "2"), which is disclosed in more detail in FIG. 4f. Next, a financial account registration entry form (designated as subroutine "3") is provided, using a process disclosed in more detail in FIG. 4g. In step 510, the application launches a browser window for the end user with a specified Financial Account Registration URL. In step 512, the end user's web browser initiates a Secure Socket Layer connection to the secure server 202. In step 514, the secure server 202 responds to establish the SSL connection.

Next, in step 516, the Financial Account Registration Application in secure server 202 dynamically generates financial account registration request form data and transmits this data to the end user's web browser. In step 518, the browser displays the form for the end user.

The end user, in steps 520 and 522, selects the financial account type to be registered, either credit card or bank account.

If a credit card is selected, the process continues at step 524 where credit card fields are displayed for the end user. Continuing on FIG. 4c, in step 530 the end user inputs card data. Then, in step 534, the browser encrypts the entered card data using SSL protocols. The Financial Account Registration Application confirms the end user's login (designated as Subroutine "2", see FIG. 4f) and performs the card registration process shown in FIGS. 4i and 4j (designed as Subroutine "5").

If a bank account is selected, the process continues from step 522 to step 526 where bank account data entry fields are displayed for the end user. Continuing on FIG. 4c, in step 528 the end user inputs bank account data. Then, in step 534, the browser encrypts the entered bank account data using SSL protocols. The Financial Account Registration Application confirms the end user's login (designated as Subroutine "2", see FIG. 4f) and performs the bank account registration process shown in FIG. 4k (designed as Subroutine "6").

As shown in FIG. 4c, regardless of whether a card or bank account was selected for registration, after Subroutine 6 or 7 is processed to register the financial account information, operation continues at step 535 where the financial account registration application parses and logs the response from the appropriate registration subroutine. Next, in step 536, the application sends confirmation codes and a success message to the end user's browser. In an embodiment, the confirmation codes are an array of values presented to the end user during enrollment confirmation that serve as a shared secret between the system and the end user. The confirmation codes may be used in conjunction with the external request ID as a key to retrieving a token from the system.

The browser displays a confirmation in step 538, and in step 540 the end user's system requests a reference ID that identifies the just-registered card or account. After validating the user's login to the Payment Application (merchant server 204), the reference ID (also referred to as a financial account token) is transmitted to the merchant server 204 using the process in FIG. 4l, (designated as Subroutine "7"). The payment application in the merchant server 204 displays a success message in step 542 and stores the reference ID for future use, in step 544.

Figure 4D:
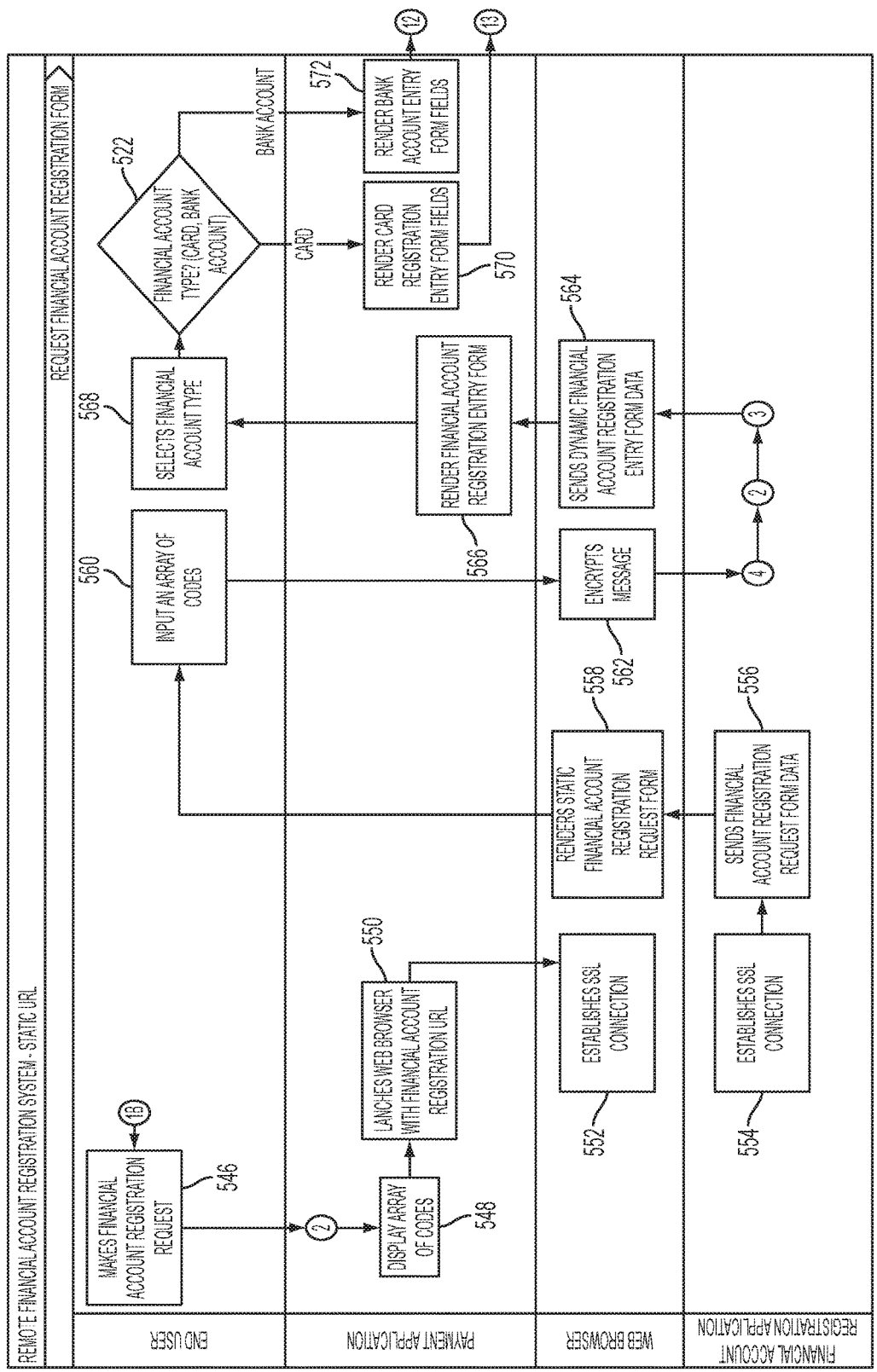
Figure 4E:
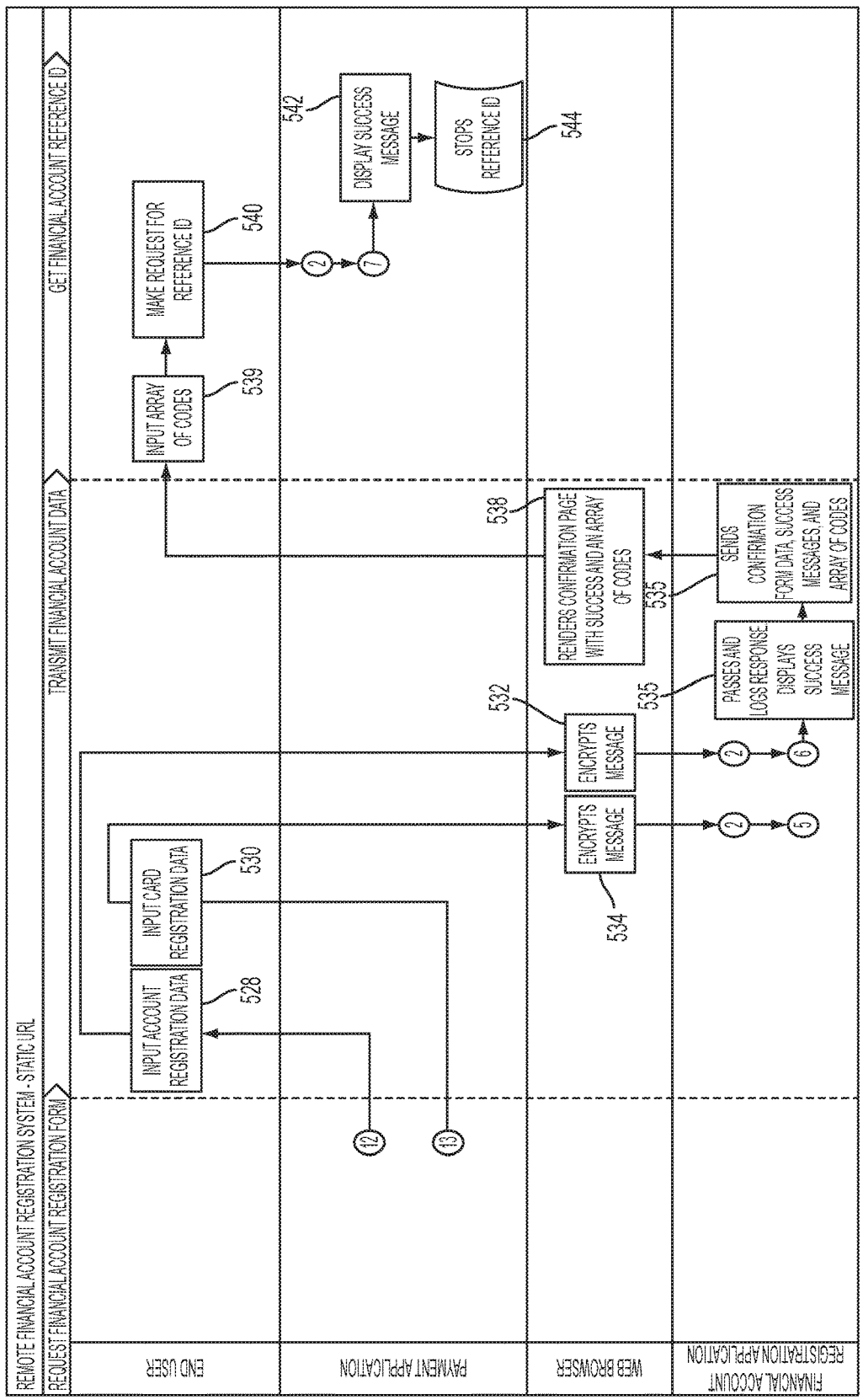

FIGS. 4d and 4e combine to show an example flow chart for a static URL implementation. Referring first to FIG. 4d, this process starts at step 546 when the end user requests registration of a financial account. Subroutine "2" is then activated in the merchant server payment application to ensure that the end user is properly identified by the system and that information entered by the end user is associated with the correct user and account. The payment application then displays an array of codes in step 548 and launches a web browser with a financial account registration URL 550.

In step 552, the end user's browser requests an SSL connection from the indicated static URL pointing to the secure server 202, and in step 554 the financial account registration application establishes the SSL connection. In step 556 the registration application sends account registration request form data in a static form to the browser. Then, the browser displays the static form in step 558. In steps 560 and 562, the end user's system transmits the array of codes (provided by the payment application in step 548) in an encrypted form to the financial account registration application. The financial account registration application then sequentially executes Subroutines "4", "2", and "3". Subroutine "4" implements IP address access and restrictions as shown in FIG. 4h. Subroutine "2" verifies identity of the user (see FIG. 4f), and Subroutine "3" obtains the financial account registration entry form (see FIG. 4g).

Next, in step 564, the financial account registration entry form is transmitted to the end user's browser and rendered in step 566. The end user selects a financial account type in step 568. If a card is selected, the process continues with step 570 and the card registration fields are rendered.

If a credit card is selected, the process continues in FIG. 4e at step 530 where the end user inputs card data. Then, in step 534, the browser encrypts the entered card data using SSL protocols. The Financial Account Registration Application confirms the end user's login (designated in the flow chart as Subroutine "2", see FIG. 4f) and performs the card registration process shown in FIGS. 4i and 4j (designated in the flow chart as Subroutine "5").

If a bank account is selected, the process continues in FIG. 4e at step 528 where the end user inputs bank account data. Then, in step 534, the browser encrypts the entered bank account data using SSL protocols. The Financial Account Registration Application confirms the end user's login (designated in the flow chart as Subroutine "2", see FIG. 4f) and performs the bank account registration process shown in FIG. 4k (designated in the flow chart as Subroutine "6").

Regardless of whether a card or bank account was selected for registration, after subroutine 6 or 7 is processed to register the financial account information, operation continues as shown in FIG. 4e at step 535, where the financial account registration application parses and logs the response from the appropriate registration subroutine. Next, in step 536, the application sends confirmation codes and a success message to the end user's browser. The browser displays a confirmation in step 538. In step 539, the array of confirmation codes is provided. In an embodiment, the confirmation codes are an array of values presented to the end user during enrollment confirmation that serve as a shared secret between the system and the end user. The confirmation codes may be used in conjunction with the external request ID as a key to retrieving a token from the system. In step 540 the end user's system uses the confirmation codes to request a reference ID that identifies the just-registered card or account. After validating the user's login to the Payment Application (merchant server 204), the reference ID (also referred to as a financial account token) is transmitted to merchant server 204 using the process in FIG. 4l, (designated as Subroutine "7"). The payment application in the merchant server 204 displays a success message in step 542 and stores the reference ID for future use, in step 544.

Figure 4F:
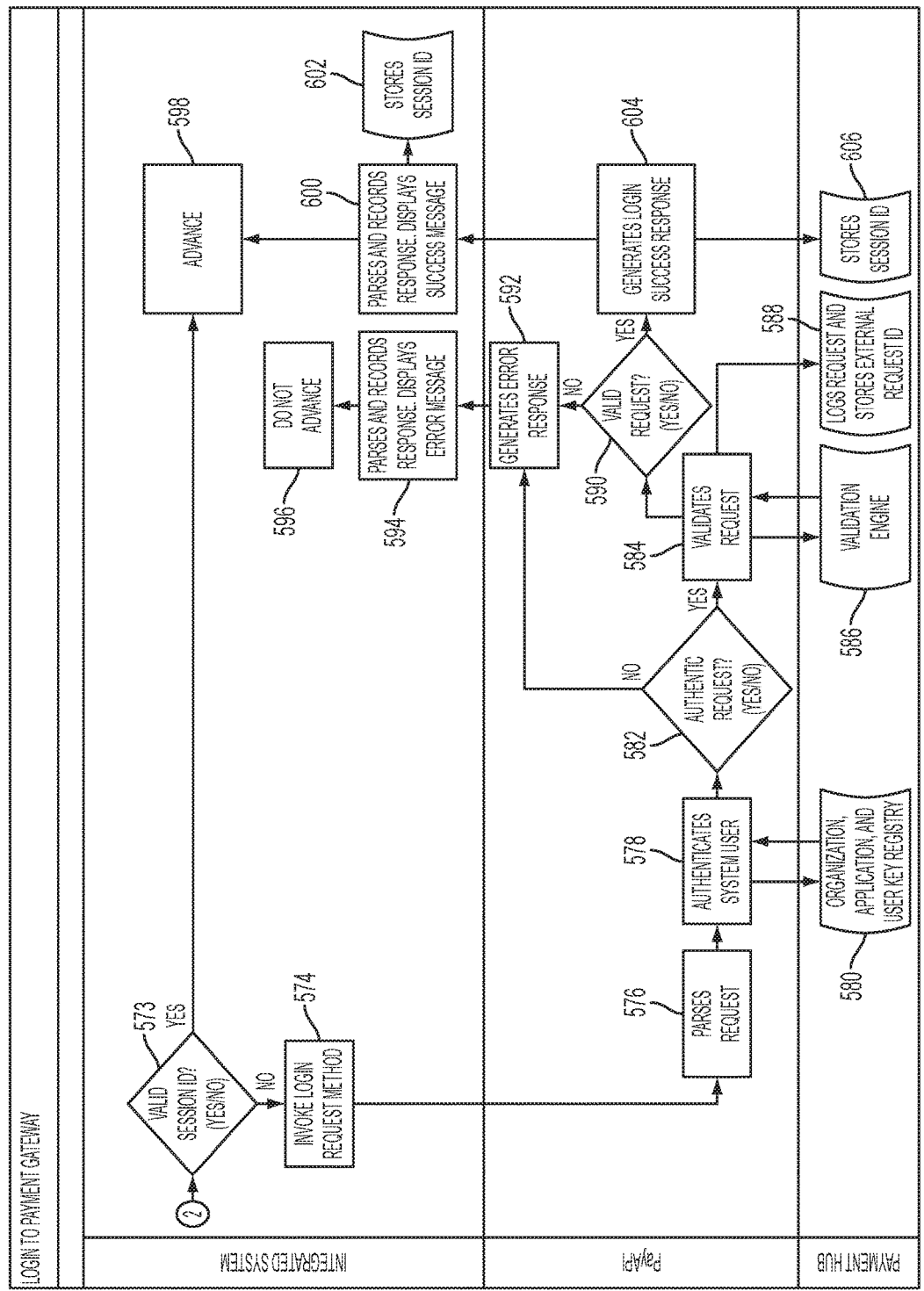

FIG. 4f shows an example embodiment of a payment gateway login function subroutine, referenced in the various flow charts of FIG. 4 as Subroutine "2". Starting at step 573, the routine determines whether the session identifier provided by the end user is valid for a current active session. If so, the process concludes at step 598 and the user is permitted to access the relevant system. If not, a login request method is invoked at step 574. The API then parses the request at step 576, and authenticates the system user at step 578. During step 578 the system may access the organization application and user key registry at step 580. In step 582, the system determines whether the request is authentic.

If not authentic, an error response is generated in step 592, an error message is displayed in step 594, and the subroutine concludes at step 596 where the user is not permitted to advance, i.e. access the system. If the request is deemed authentic in step 582, the request is validated in step 584 through a validation engine operational step 586. The request is logged and an external request ID is stored in step 588. The external request ID is an input parameter for session requests. In an embodiment, the external request ID serves as a shared secret between the requesting application and the system, and is later used as a key to retrieving a token from the system.

In step 590, if the validation step 584 indicated a valid request, a login success response occurs at step 604, the session ID is stored at step 606, a success message is transmitted, parsed and displayed in step 600, session ID is stored at step 602, and the user is allowed to advance (step 598). If the request is deemed invalid at step 590, processing continues with steps 592-596 as described previously.

Figure 4G:
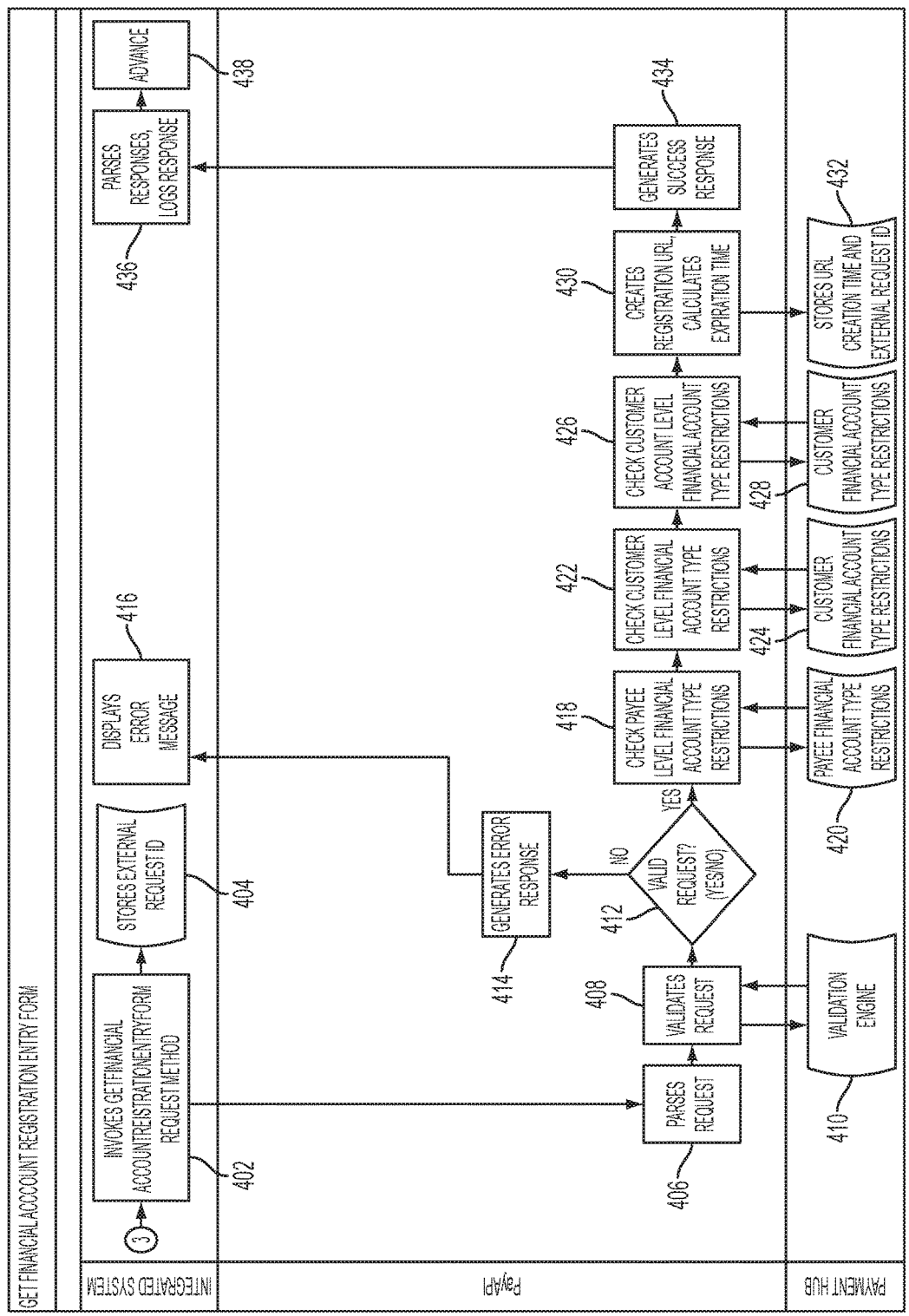
Figure 4H:
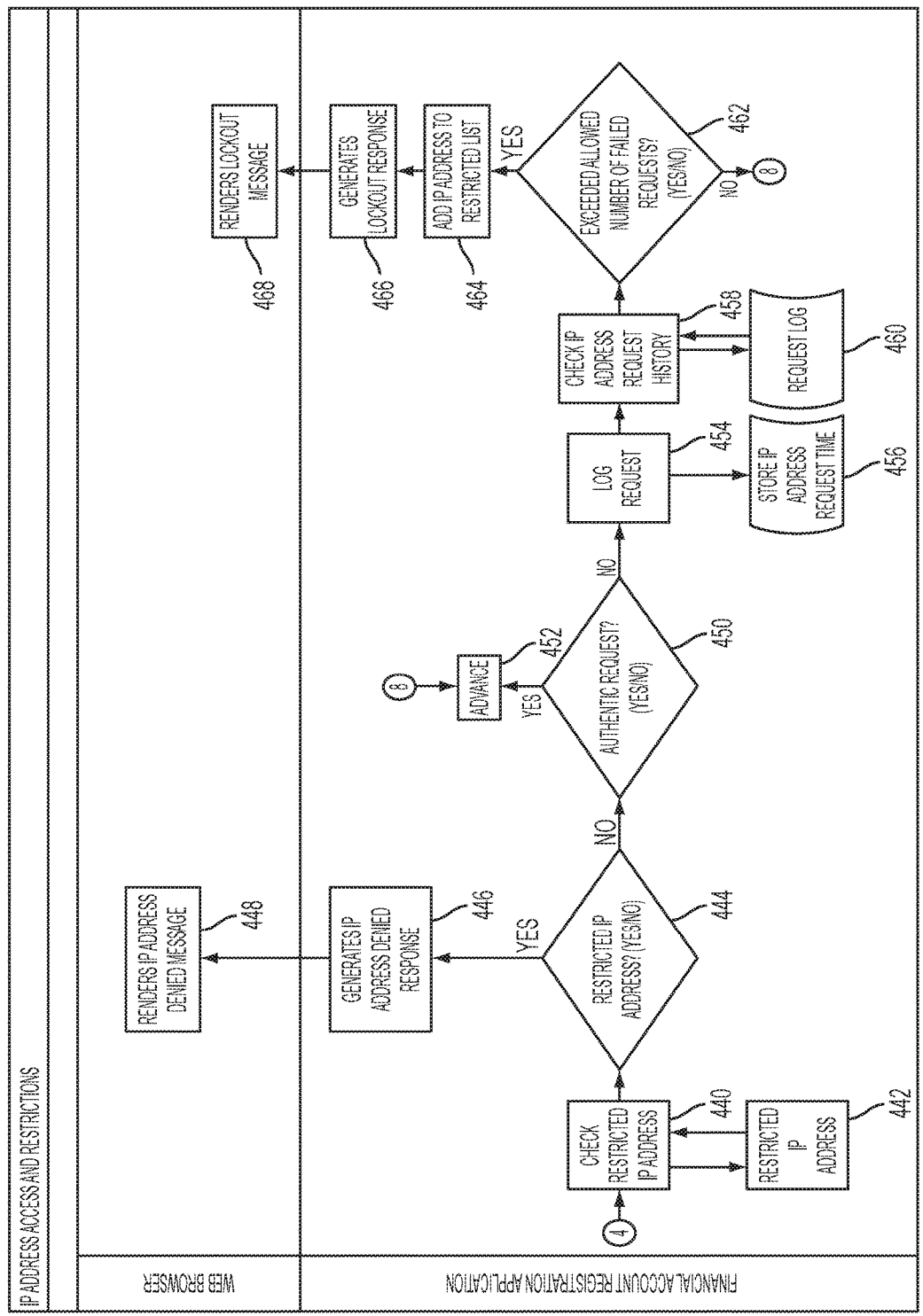

FIG. 4g shows an example process for obtaining a financial account registration entry form. Starting at step 402, the process invokes a method for obtaining the form as established in the API. In step 404 the system stores the external request ID received from the system requesting the collection of financial account information. The API engine in the secure server 202 parses the request in step 406. In step 408, the API validates the request by connecting to the validation engine (step 410). In step 412, the API determines whether the request is valid. If not, an error response is generated in step 414 and an error message is displayed in step 416. If the request is valid, the process continues at step 418 where the request is checked against any programmed restrictions at the payee level by interacting with the payment hub (step 420) to ensure validity of the request. For example, if the payee has indicated it does not wish to accept credit cards, a request to store credit card information would be invalid. In step 422, the request is similarly checked against any customer-level restrictions on account type, by obtaining data stored in the payment hub (step 424). For example, if a particular category of customer is permitted to pay only with a credit card and not using a bank account, requests outside the permitted operations would be invalid. Then, in step 426, the request is checked against any "customer account level" restrictions on account type, by obtaining data stored in the payment hub (step 428).

In step 430, the API creates a registration URL and (optionally) establishes an expiration time for the URL. The expiration time may be 5 minutes, 30 minutes, several hours, or a day or more, depending on the nature of the interaction with the payer, which will determine the scope of a "reasonable time" to complete the transaction. In a seamless online transaction, the time allowed might be relatively short, for example, measured in minutes. In a bill collector transaction where the payer has agreed to go online at a later time and enter payment information, the time allowed would be longer, for example, measured in days. In step 432, the URL creation time is logged and the external request ID is stored. In step 434, a success response is generated. In step 436, the calling system receives the success response from the API and logs the response. Then, in step 438, the subroutine is concluded and control advances to the next function in the calling program.

FIG. 4h is a flow chart for Subroutine "4", which verifies IP address access and restrictions. First, in step 440, the IP address seeking access to the system is checked for restrictions, through interaction with a database of restricted addresses (step 442). In step 444, the subroutine branches based on the restrictions found. If the IP address is restricted, then in step 446 an error response is generated and in step 448 the end user's web browser displays the error message. If no restriction is found, the process continues at step 450, and the request is judged as either authentic or not authentic.

If the request is authentic, the subroutine terminates at step 452. If the request is not authentic, it is logged at step 454 and the time of the request is recorded in step 456. In step 458, the history of requests from the IP address is reviewed with reference to a request log (step 460). In step 462, if the number of allowed failed requests in a given time period has not been exceeded, the subroutine terminates at step 452. If the number of allowed failed requests from an IP address has been exceeded, the IP address is added to the restricted list in step 464, a lockout is established in step 466, and a lockout message is displayed in step 468.

Figure 4I:
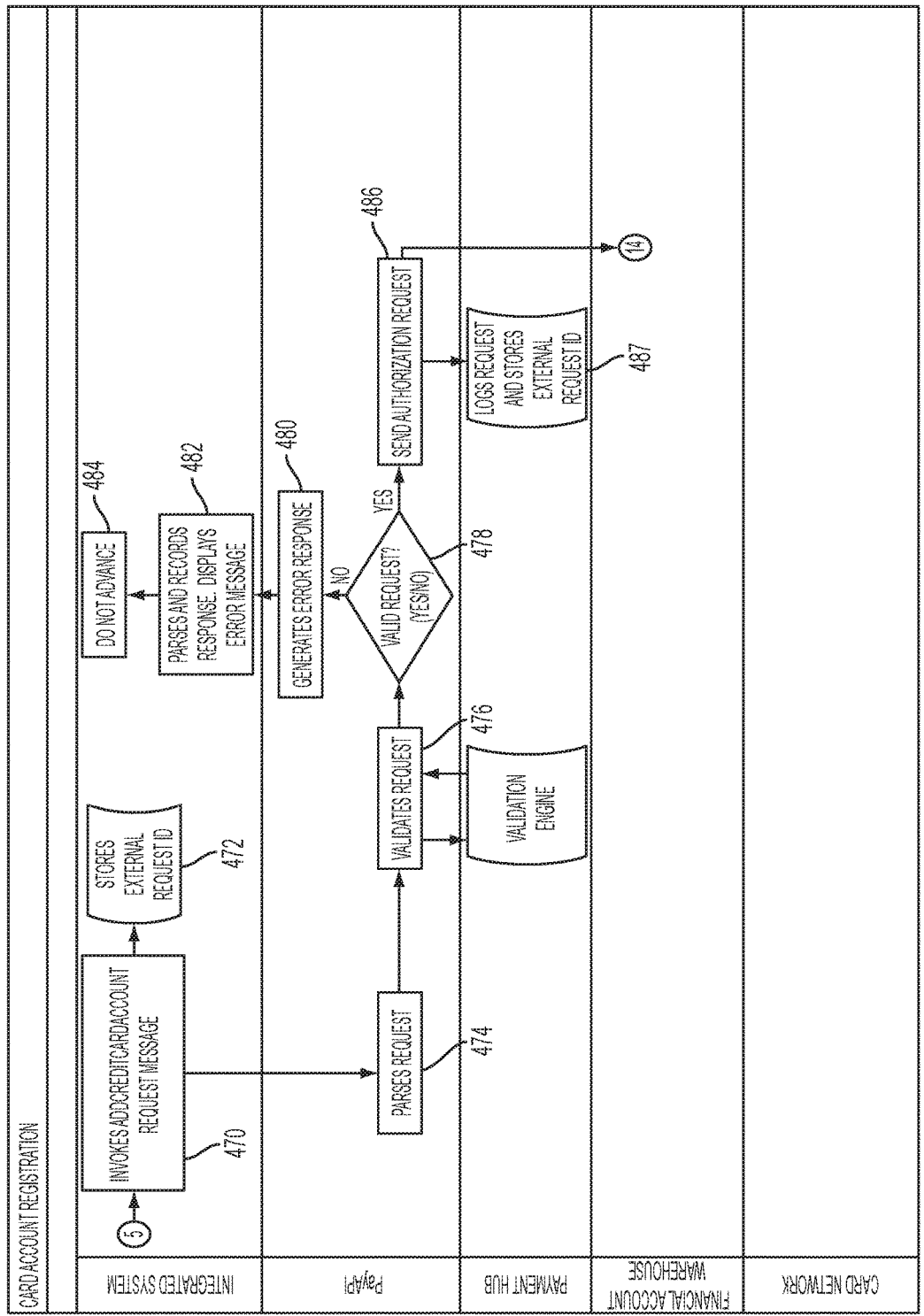
Figure 4J:
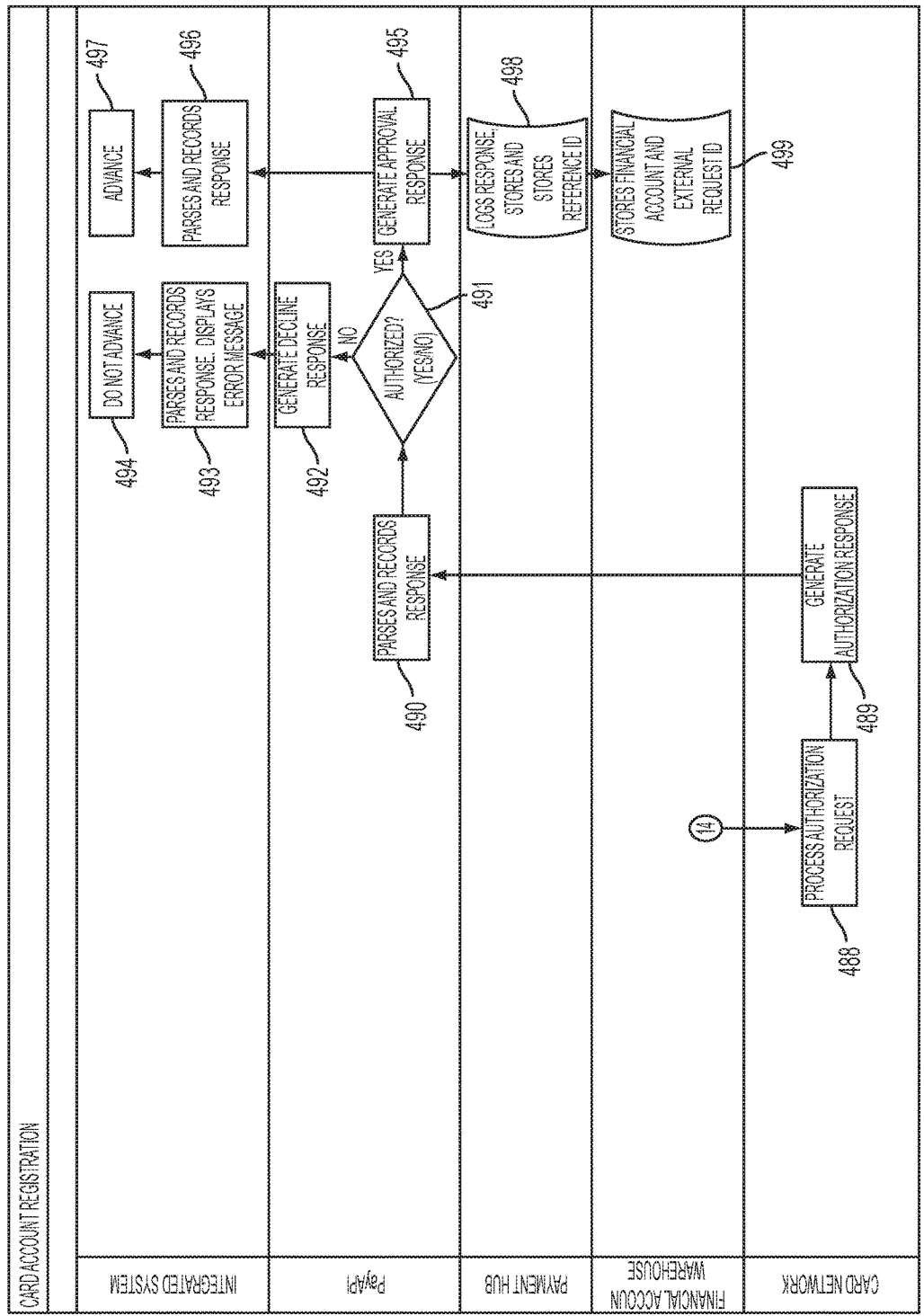

FIGS. 4*i* and 4*j* (taken together) comprise a flow chart showing the card account registration process, referenced as Subroutine "5". Referring first to FIG. 4*i*, the system initially invokes an API method to add a credit card account, in step 470. In step 472, the external request ID associated with the customer is stored. In step 474, the API engine parses the request and in step 476, validates the request. If the request is invalid in step 478, an error response is generated in step 480, and the error message is displayed in step 482. The subroutine then terminates in step 484 without registering a card.

If the request is valid in step 478, an authorization request is generated in step 486, and the request is logged in step 487.

Continuing in FIG. 4*j*, the authorization request is processed by the card network in step 488 and a response is generated in step 489. The API engine receives the response and parses it and records it, in step 490. If the card data was authorized, in step 491, an approval response is generated in step 495, the approval response is transmitted to the calling system in step 496, and the subroutine terminates in step 497. Also, in case of authorization, the payment hub logs the response and stores the reference ID. The financial account secure server (referred to as the "warehouse") stores the financial account information (card information) and the external request ID in step 499.

If the credit card is not authorized in step 491, a decline response is generated in step 492, an error message is displayed for the user in step 493, and the subroutine terminates at step 494 without storing card information.

Figure 4K:
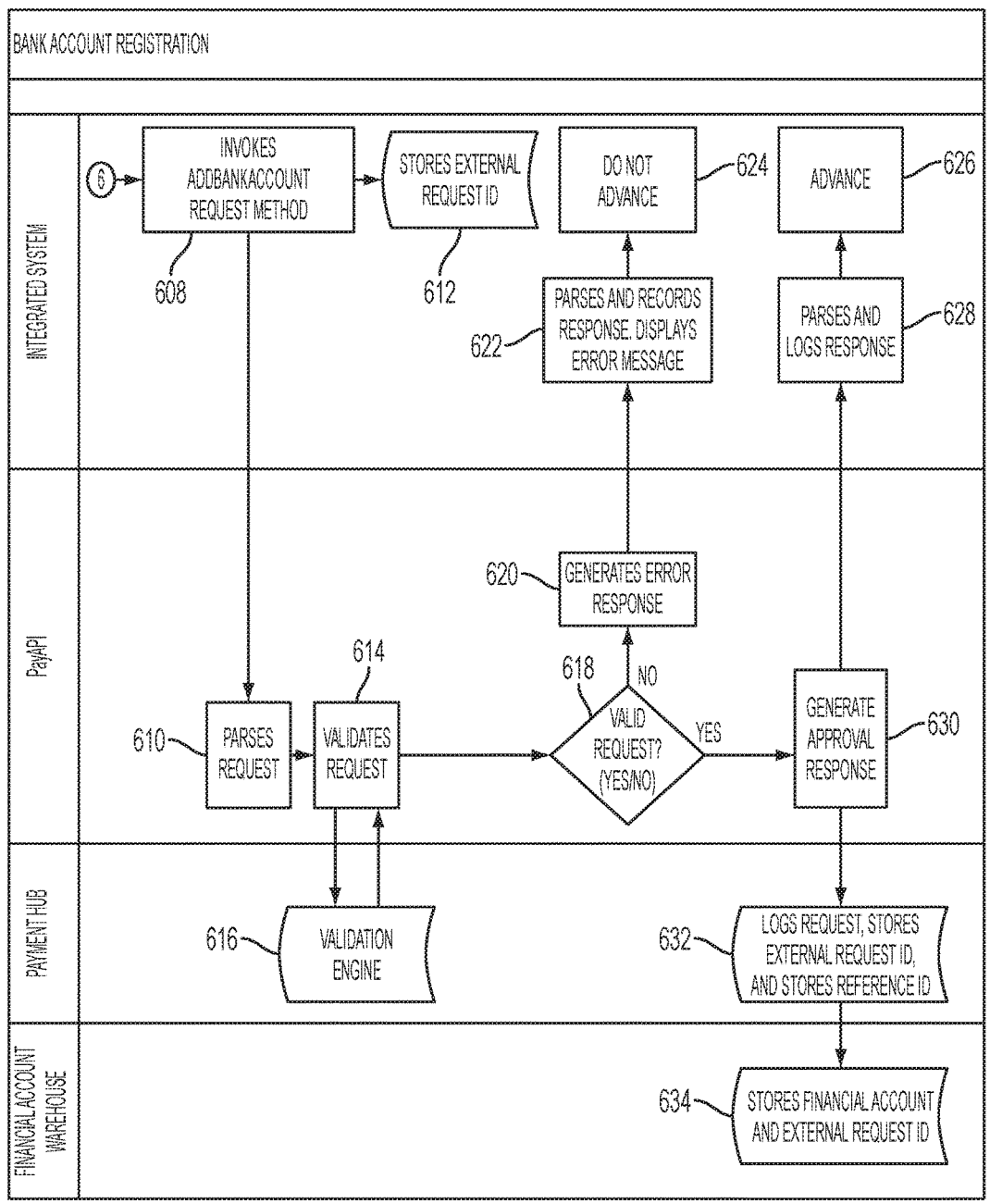
Figure 41:
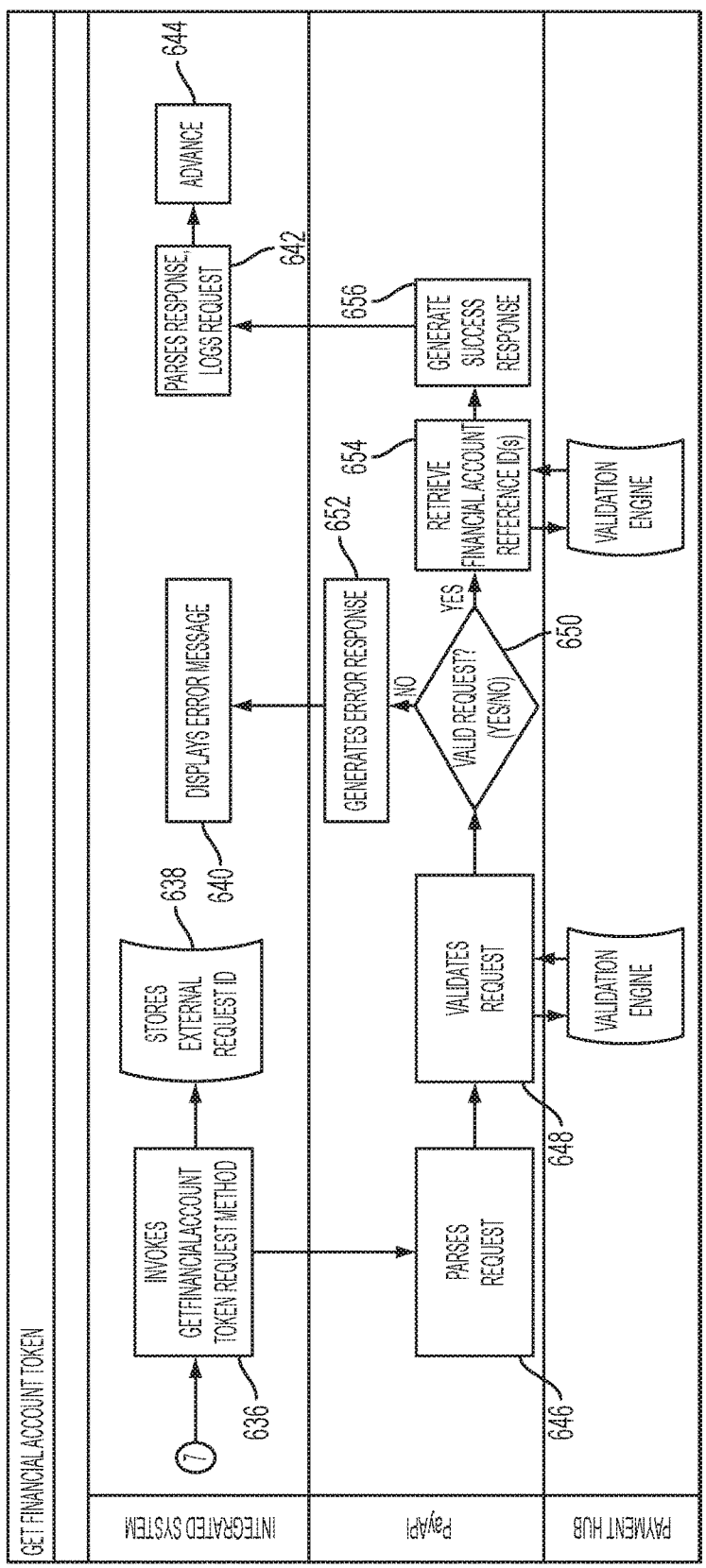

FIG. 4*k* is a flow chart for the bank account registration subroutine (referenced as subroutine "6"). In step 608, the add bank account method of the API is invoked by the calling system, and the external request ID is stored in step 612. In step 610, the API engine parses the request and validates it in step 614 by communicating with a validation engine (step 616). Step 618 determines whether the request is valid. If so, an approval response is generated in step 630. Then, in step 632 the request is logged, the external request ID is stored, and the reference ID is stored, and in step 634 the bank account information and external request ID are stored in the secure server. At the same time, in step 628, the approval response is received by the calling system and parsed and logged, whereupon the subroutine terminates at step 626.

If the request is not valid in step 618, an error response is generated at step 620, the response is transmitted to the calling system, where it is parsed at step 622 and displayed, and the subroutine terminates at step 624 without storing any bank account information.

FIG. 4*l* is a subroutine for a process of obtaining a financial account token. In step 636, the get token request method of the API is invoked by the calling system. The API engine parses the request in step 646 and validates it in step 648. If the request format is invalid, an error response is generated in step 652 and an error message is displayed in step 640, whereupon the subroutine terminates. If the request format is valid, the financial account reference ID(s) are retrieved in step 654, and a success response is generated in step 656. The response is parsed by the calling system in step 642 and the subroutine terminates in step 644.

The programmed functions implementing the methods and processes described herein can be provided in a variety of forms. In one preferred embodiment, as noted previously, the functions provided by secure server 202 may be accessed in the form of an API defining functions available to the merchant server 204. These functions may be implemented in the manner described in U.S. Provisional Patent Application Ser. No. 61/655,482 filed Jun. 5, 2012 and U.S. Provisional Patent Application Ser. No. 61/698,574 filed Sep. 8, 2012, the disclosures of which are incorporated herein by reference. Those skilled in the art will appreciate that the method of defining the API and the particular API features provided may be varied as desired within the scope of the invention, to implement desired concepts described herein and variations on those concepts that will be apparent to those skilled in the art after reviewing this specification.

The screen displays described herein may be designed in any desired manner consistent with achieving the goals of a particular variation, and the screen displays may take various forms without departing from the scope or spirit of the invention. For example, the screen displays may have the form disclosed in U.S. Provisional Patent Application Ser. No. 61/655,482 filed Jun. 5, 2012 and U.S. Provisional Patent Application Ser. No. 61/698,574 filed Sep. 8, 2012, the disclosures of which are incorporated herein by reference.

Although illustrative embodiments have been described herein in detail, it should be noted and understood that the descriptions and drawings have been provided for purposes of illustration only and that other variations both in form and detail can be added thereto without departing from the spirit and scope of the invention. The terms and expressions in this disclosure have been used as terms of description and not terms of limitation. Thus, the breadth and scope of the present invention should not be limited by any of the above-described exemplary embodiments, but should be defined only in accordance with the claims and their equivalents. The terms and expressions herein should not be interpreted to exclude any equivalents of features shown and described, or portions thereof.

We claim:

1. A method of enrolling a payer by a first computing system operated for the benefit of a payee, the method comprising:
   receiving enrollment data identifying a payer;
   generating an electronic instruction for a second computing system that includes at least one data element associated with the payer and specifies a communications link for the second computing system to obtain financial account information from the payer;
   outputting the electronic instruction to a communications network for transmittal to the second computing system;
   receiving an electronic data token representing the financial account information obtained by the second computing system via the specified communications link from the second computing system, wherein the first computing system does not receive the financial account information represented by the electronic data token and the second computing system does not provide the electronic data token to the payer;

storing the electronic data token in association with the enrollment data identifying the payer; and processing a payment from the payor to the payee by electronically generating a payment transaction instruction that includes a representation of the electronic data token and electronically transmitting the payment transaction instruction to a payment processing system having access to the financial account information represented by the electronic data token.

2. The method of claim 1, wherein the communications link used to obtain the financial account information from the payer is synchronous with a communications link used to obtain the enrollment data.

3. The method of claim 1, wherein the communications link is at least one of a telephone number to enable the second computing system to communicate with the payer and obtain the financial account information or a transfer from an existing telephone call with the payer to a telephone system that receives the financial account information from the payer.

4. The method of claim 1, wherein the communication link is a secure connection via the internet between the second computing system and a computing system used by the payer enabling the payer to input the financial account information for transmittal to the second computing system.

5. The method of claim 4, wherein the secure connection is a widget or window within a website provided by the first computing system.

6. The method of claim 4, wherein the secure connection provides access to the second computing system using a static or dynamic universal resource locator (URL).

7. The method of claim 1, wherein the communications link used to obtain the financial account information from the payer is asynchronous with a communications link used to obtain the enrollment data.

8. The method of claim 7, wherein the electronic instruction for the second computing system to obtain the financial account information from the payer includes data sufficient for the second computing system to authenticate the payer.

9. The method of claim 8, wherein the first computing system defines a period of persistence for the second computing system to obtain the financial account information from the payer.

10. The method of claim 1, wherein the electronic instruction comprises contact information for the payer to enable the second computing system to transmit instructions to the payer for communicating the financial account information to the second computing system.

11. The method of claim 10, wherein the contact information comprises one of an email address or a telephone number whereby the second computing system sends a link for a secure data entry connection to the payer via one of email and text.

12. The method of claim 1, wherein the enrollment data identifying the payer is received by telephone, by receiving the enrollment data from the payer over a network, or by receiving a data file.

13. The method of claim 1, wherein the financial account information includes at least one of a credit card number or bank account number.

14. The method of claim 1, wherein the payment processing system is the second computing system.

15. A first computing system operated for the benefit of a payee, the first computing system comprising:
one or more processors; and
memory storing instructions that, when executed by the one or more processors, cause the first computing system to:
receive enrollment data identifying a payer;
generate an electronic instruction for a second computing system that includes at least one data element associated with the payer and specifies a communications link for the second computing system to obtain financial account information from the payer;
output the electronic instruction to a communications network for transmittal to the second computing system;
receive an electronic data token representing the financial account information obtained by the second computing system via the specified communications link from the second computing system, wherein the first computing system does not receive the financial account information represented by the electronic data token and the second computing system does not provide the electronic data token to the payer;
store the electronic data token in association with the enrollment data identifying the payer; and
process a payment from the payor to the payee by electronically generating a payment transaction instruction that includes a representation of the electronic data token and electronically transmitting the payment transaction instruction to a payment processing system having access to the financial account information represented by the electronic data token.

16. The system of claim 15, wherein the communications link used to obtain the financial account information from the payer is synchronous with a communications link used to obtain the enrollment data.

17. The system of claim 15, wherein the communication link is a secure connection via the internet between the second computing system and a computing system used by the payer enabling the payer to input the financial account information for transmittal to the second computing system.

18. The system of claim 17, wherein the secure connection is a widget or window within a website provided by the first computing system.

19. The system of claim 18, wherein the secure connection provides access to the second computing system using a static or dynamic universal resource locator (URL).

20. The system of claim 15, wherein the communications link used to obtain the financial account information from the payer is asynchronous with a communications link used to obtain the enrollment data.

21. The system of claim 20, wherein the electronic instruction for the second computing system to obtain the financial account information from the payer includes data sufficient for the second computing system to authenticate the payer.

22. The system of claim 20, wherein the first computing system defines a period of persistence for the second computing system to obtain the financial account information from the payer.

23. The system of claim 15, wherein the electronic instruction comprises contact information for the payer to enable the second computing system to transmit instructions to the payer for communicating the financial account information to the second computing system.

24. The system of claim 15, wherein the financial account information includes at least one of a credit card number or bank account number.

25. The system of claim 15, wherein the payment processing system is the second computing system.

26. A non-transitory computer readable storage medium storing instructions that, when executed by a processor, cause a first computing system operated for the benefit of a payee to:
- receive enrollment data identifying a payer;
- generate an electronic instruction for a second computing system that includes at least one data element associated with the payer and specifies a communications link for the second computing system to obtain financial account information from the payer;
- output the electronic instruction to a communications network for transmittal to the second computing system;
- receive an electronic data token representing the financial account information obtained by the second computing system via the specified communications link from the second computing system, wherein the first computing system does not receive the financial account information represented by the electronic data token and the second computing system does not provide the electronic data token to the payer;
- store the electronic data token in association with the enrollment data identifying the payer; and
- process a payment from the payor to the payee by electronically generating a payment transaction instruction that includes a representation of the electronic data token and electronically transmitting the payment transaction instruction to a payment processing system having access to the financial account information represented by the electronic data token.

* * * * *